(12) United States Patent
Pywell

(10) Patent No.: US 9,610,899 B2
(45) Date of Patent: Apr. 4, 2017

(54) REMOVABLE CUSHION THAT PROVIDES AN INSULATED COOLING VOLUME

(71) Applicant: GM Global Technology Operations LLC, Detroit, MI (US)

(72) Inventor: James F. Pywell, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/589,282

(22) Filed: Jan. 5, 2015

(65) Prior Publication Data

US 2016/0193949 A1      Jul. 7, 2016

(51) Int. Cl.
| | |
|---|---|
| *B60R 7/04* | (2006.01) |
| *B60N 3/10* | (2006.01) |
| *B60N 2/44* | (2006.01) |
| *B60N 2/02* | (2006.01) |
| *B60N 2/30* | (2006.01) |

(52) U.S. Cl.
CPC ............... *B60R 7/043* (2013.01); *B60N 2/02* (2013.01); *B60N 2/305* (2013.01); *B60N 2/442* (2013.01); *B60N 3/104* (2013.01); *B60N 2002/0216* (2013.01)

(58) Field of Classification Search
CPC .......... A47C 7/62; B60R 7/043; B60N 3/104; B60N 2/305; B60N 2/442; B60N 2/02; B60N 2/28; B60N 2/2866
USPC ..... 297/188.01, 188.2, 250.1, 188.1, 253, 4, 297/188.13; 296/37.15; 224/275; 16/221, DIG. 43, 223
See application file for complete search history.

(56) References Cited

U.S. PATENT DOCUMENTS

| | | | | | |
|---|---|---|---|---|---|
| 1,156,367 | A | * | 10/1915 | Masler | A47C 7/62 297/118 |
| 2,427,230 | A | * | 9/1947 | Salzmann | F25D 3/08 62/261 |
| 2,812,227 | A | * | 11/1957 | Hill | A47B 69/00 297/188.1 |
| 3,338,629 | A | * | 8/1967 | Drees | B60N 3/002 224/275 |
| 4,060,276 | A | * | 11/1977 | Lindsay | A47C 7/74 297/180.11 |
| 4,106,829 | A | * | 8/1978 | Dolle | B60N 2/4673 224/275 |
| 4,291,915 | A | * | 9/1981 | Cox | B60N 2/2866 190/8 |
| 4,353,182 | A | * | 10/1982 | Junkas | A01K 97/06 206/315.11 |
| 4,512,503 | A | * | 4/1985 | Gioso | B60R 7/043 206/216 |
| 4,773,709 | A | * | 9/1988 | Slinkard | B63B 29/04 114/363 |
| 5,050,767 | A | * | 9/1991 | Peer | A45C 5/00 220/476 |

(Continued)

FOREIGN PATENT DOCUMENTS

| | | | |
|---|---|---|---|
| CN | 202723489 U | * | 2/2013 |
| CN | 103565235 A | * | 2/2014 |

*Primary Examiner* — Milton Nelson, Jr.
(74) *Attorney, Agent, or Firm* — BrooksGroup

(57) ABSTRACT

A number of variations may include a product comprising: a removable seat bottom for a vehicle comprising a seat cushion and a storage unit, wherein the seat cushion is pivotally attached to the storage unit.

10 Claims, 3 Drawing Sheets

(56) References Cited

U.S. PATENT DOCUMENTS

| | | | | |
|---|---|---|---|---|
| 5,269,157 | A * | 12/1993 | Ciminelli | A45B 11/00 280/47.18 |
| 5,586,805 | A * | 12/1996 | Rinehart | A47C 9/10 206/216 |
| 5,597,201 | A * | 1/1997 | Hinze | B60N 2/32 224/540 |
| 5,667,115 | A * | 9/1997 | Verhaeg | B60R 7/043 224/275 |
| 5,727,844 | A * | 3/1998 | O'Quinn | A47C 7/744 206/216 |
| 5,755,057 | A * | 5/1998 | Dancer | A01K 97/06 206/315.11 |
| 6,142,574 | A * | 11/2000 | Alexander | B60N 2/441 297/188.2 |
| 6,739,655 | B1 * | 5/2004 | Schwochert | B62J 1/12 297/188.01 |
| 7,604,290 | B1 * | 10/2009 | Giordano | A47C 3/32 220/915.2 |
| 2006/0261654 | A1 * | 11/2006 | Stallman | A47C 15/004 297/310 |
| 2008/0141704 | A1 * | 6/2008 | Williams | F25D 21/14 62/457.1 |
| 2015/0007603 | A1 * | 1/2015 | Keenan | F25D 3/08 62/419 |

* cited by examiner

REMOVABLE CUSHION THAT PROVIDES AN INSULATED COOLING VOLUME

TECHNICAL FIELD

The field to which the disclosure generally relates to includes seats.

BACKGROUND

Vehicles may include seats and a passenger cabin.

SUMMARY OF ILLUSTRATIVE VARIATIONS

A number of variations may include a product comprising a removable seat bottom for a vehicle comprising a seat cushion and a storage unit, wherein the seat cushion is pivotally attached to the storage unit.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
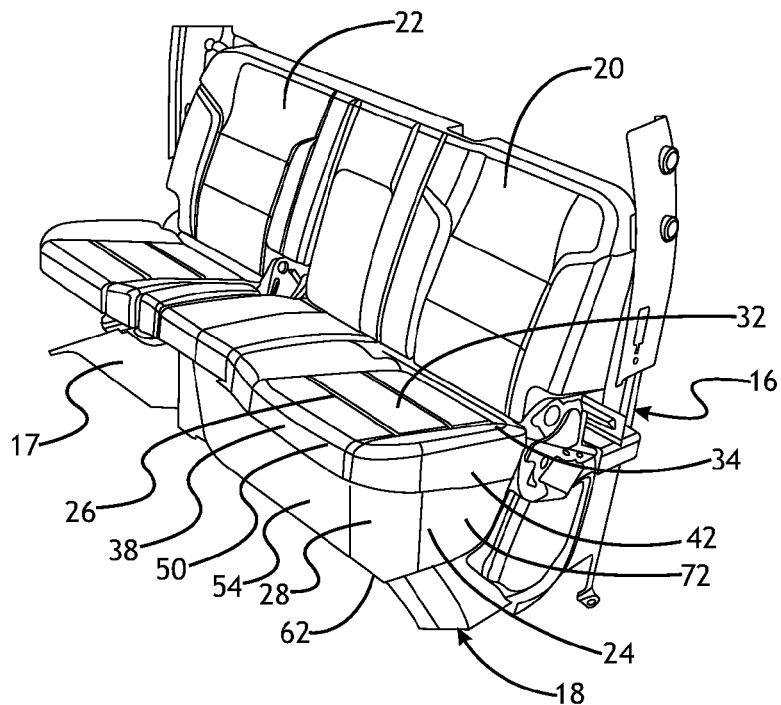
FIG. 1 illustrates a perspective view of a vehicle seat according to a number of variations.
Figure 2:
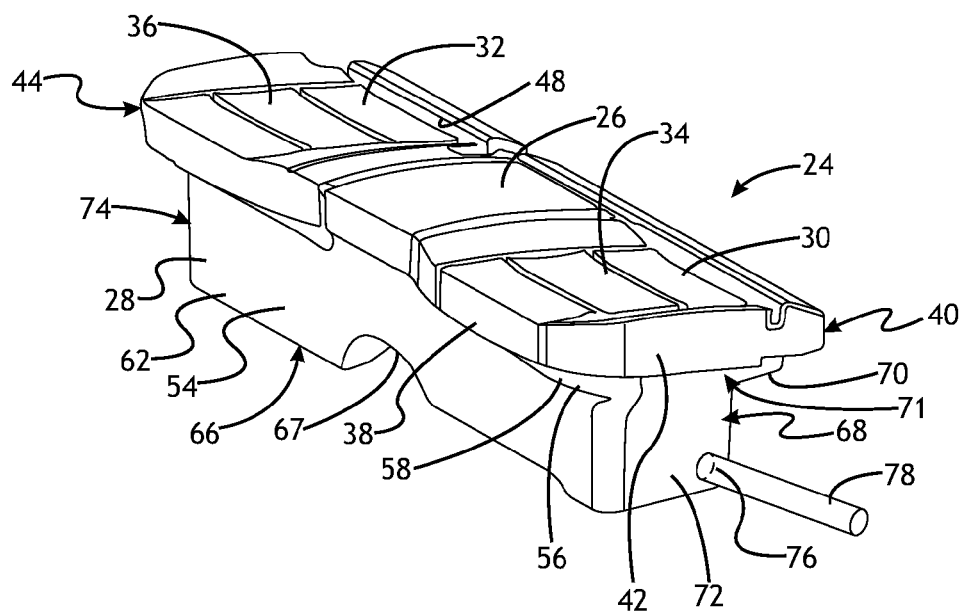
FIG. 2 illustrates a perspective view of a vehicle seat bottom according to a number of variations.

FIGS. 1-6 illustrate a number of variations. Referring to FIGS. 1 and 2, in a number of variations, a vehicle 16 including, but not limited, a pick up truck, may include a vehicle seat 20 which may be located in a rear row 18 of a vehicle cabin. The vehicle seat 20 may include a seat back 22 and an integrated storage unit seat bottom 24. The integrated storage unit seat bottom 24 may be constructed and arranged to act as a seat cushion 26 to support one or more seated occupants as well as a concealed storage unit 28. The concealed storage unit 28 may fill at least a portion of the volume between the seat cushion 26 and the vehicle floor 17. The integrated storage unit seat bottom 24 may be a single storage unit which may extend across the length of the rear row 18 so that it may sit underneath at least a first seating surface 34 and a second seating surface 36, a variation of which is illustrated in FIG. 2. In another variation, the integrated storage unit seat bottom 24 may extend under a portion of the length of the rear row 18 including, but not limited to, under either the first seating surface 34 or the second seating surface 36, a variation of which is illustrated in FIG. 1. In yet another variation, the integrated storage unit seat bottom 24 may be located between the first and the second seating surfaces 34, 36 (not illustrated). In another variation, one or more integrated storage unit seat bottoms 24 may be used in the rear row 18 including, but not limited to, a first integrated storage unit seat bottom 24 underneath a first seating surface 34 and a second integrated storage unit seat bottom 24 underneath a second seating surface 36. The one or more integrated storage unit seat bottoms 24 may be constructed and arranged so that they may be removable from the vehicle 16.

Figure 5:
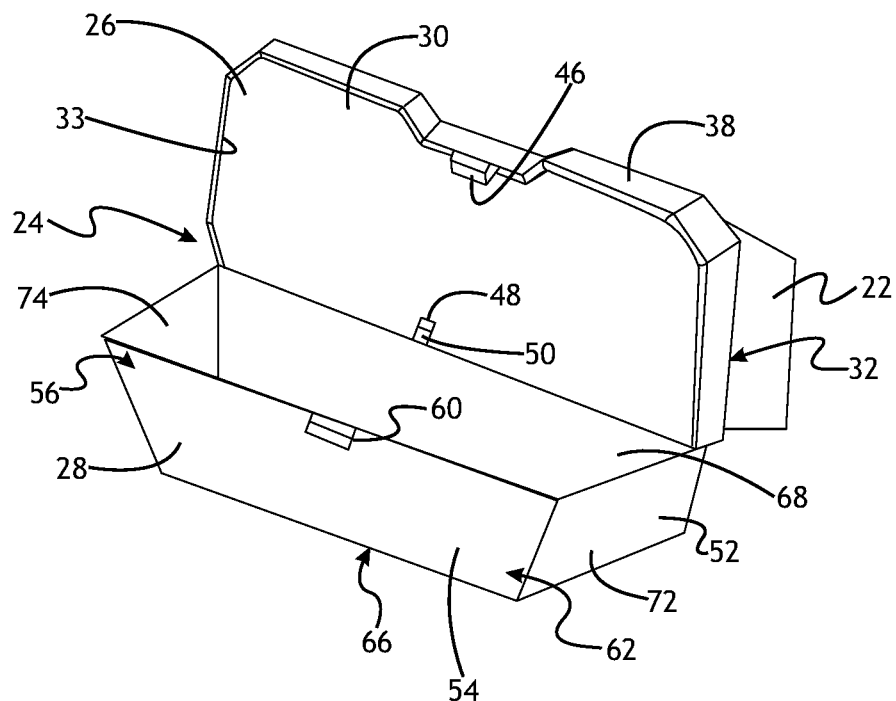
FIG. 5 illustrates a perspective view of a vehicle seat bottom in an open position according to a number of variations.

In a number of variations, an integrated storage unit seat bottom 24 seating cushion 26 may include a lid 30. The lid 30 may be constructed and arranged to attach to a base 52, as will be discussed hereafter. In a number of variations, the lid 30 may include a top face 32, a front face 38, a rear face 40, a first side face 42, and a second side face 44, a variation of which is illustrated in FIG. 2. In a number of variations, the top face 32 may include one or more seating surfaces including, but not limited to, a first seating surface 34 and/or a second seating surface 36, variations of which are illustrated in FIGS. 1 and 2. The lid 30 may also include a lip 33 which may extend downward from the front face 38, first side face 42, and the second side face 44, a variation of which is illustrated in FIG. 5, and may be constructed and arranged to extend over or within a portion of the storage unit 28. The front face 38 may include one or more locking features 46, a variation of which is illustrated in FIG. 5, including, but not limited to, one or more latches, which may be constructed and arranged to lock with a locking feature 60 on the storage unit 28, as will be discussed hereafter. The rear face 40 may be constructed and arranged to accommodate a rod or shaft 50 which may extend through at least a portion of the rear face 40 of the lid 30 and may act as a pivot or hinge feature so that the lid 30 may be pivoted opened and closed, as will be discussed hereafter. The rear face 40 may also include one or more cutout portions 48 which may be constructed and arranged so that the shaft 50 may engage a retainer clip bracket 80 which may be attached to the storage unit 28 which may allow the integrated storage unit seat bottom 24 to be removed or reattached to the vehicle 16, as will be discussed hereafter. The lid 30 may comprise any number of materials including, but not limited to, one or more polymers. In one variation, the lid 30 may comprise polypropylene with polyurethane foam on the seating surfaces 134, 136.

In a number of variations, an integrated storage unit seat bottom 24 storage unit 28 may include a base 52. In a number of variations, the base 52 may be hollow or may include one or more interior surfaces defining a storage cavity. The base 52 may comprise a front wall 54, a rear wall 68, a first side wall 72, a second side wall 74, and a bottom wall 66. In a number of variations, the base 52 may be constructed and arranged as a storage unit 28 to hold various objects which an occupant may want to store in the vehicle 16.

Figure 3:
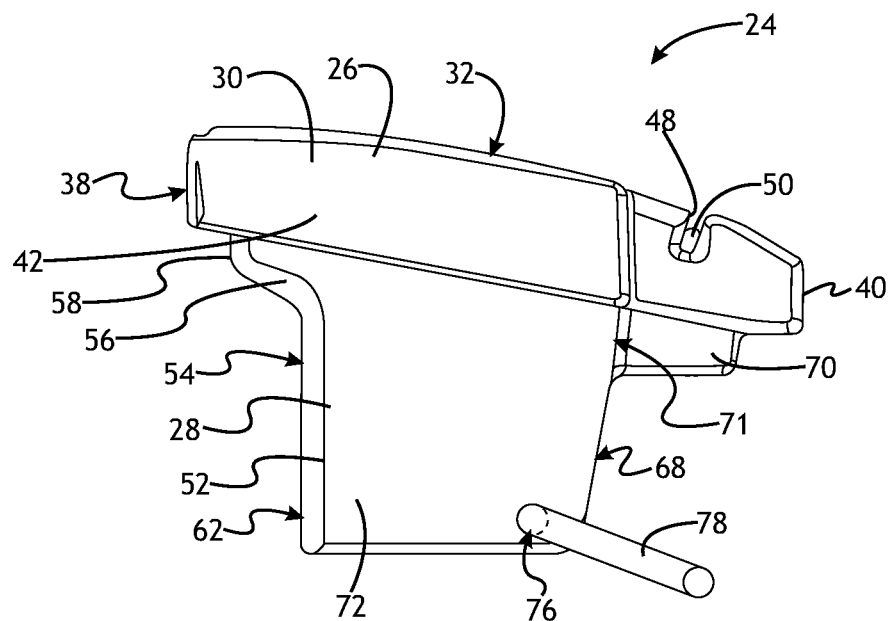
FIG. 3 illustrates a side view of a vehicle seat bottom according to a number of variations.
Figure 4:
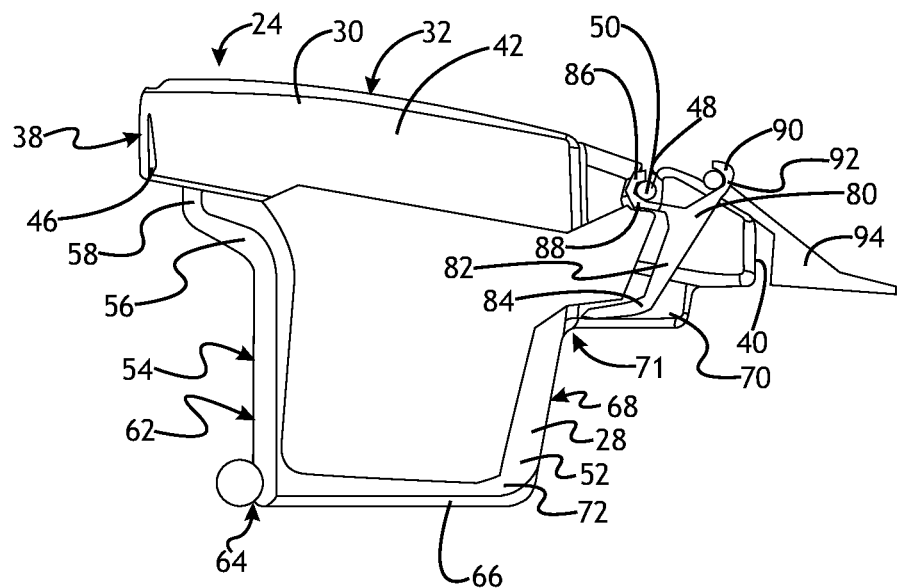
FIG. 4 illustrates a side section view of a vehicle seat bottom according to a number of variations.

In a number of variations, the front wall 54 may include a top portion 56 and a bottom portion 62. In one variation, the top portion 56 of the front wall 54 may be constructed and arranged to include one or more locking features 60, a variation of which is illustrated in FIG. 5, which may mate with the one or more locking features 46 on the lid 30 so that the lid 30 may be securely closed. In another variation, the top portion 56 of the front wall 54 may include a lip 58, variations of which are illustrated in FIGS. 3 and 4, which may extend outward from the front wall 54 and which may include one or more locking features 60 which may mate with the one or more locking features 46 on the lid 30 so that the lid 30 may be securely closed. The bottom portion 62 of the front wall 54 may be constructed and arranged to include a locking system 64 to correctly position and lock the integrated storage unit seat bottom 24 into the vehicle 16. The locking system 64 may include, but is not limited to, a passive roller positioning system which may attach to a latch locking system which may be mounted in the body in white or in a subsystem.

In a number of variations, the rear wall 68 may be constructed and arranged to accommodate one or more retainer clip brackets 80. In another variation, the rear wall 68 of the base 52 may include a lip 70 which may extend outward from a top portion 71 of the rear wall 68 and which may be constructed and arranged to accommodate at least a portion of one or more retaining clip brackets 80, variations of which are illustrated in FIGS. 3 and 4. The bottom wall 66, front wall 54, and rear wall 68 may include one or more depressions 67, a variation of which is illustrated in FIG. 2, which may be constructed and arranged so that the integrated storage unit seat bottom 24 may contour the shape of the vehicle 16 body.

In a number of variations, the base 52 may comprise an insulating material so that the integrated storage unit seat bottom 24 may be used as a cooler. In a number of variations, the first side wall 72 and/or the second side wall 74 may include a drain hole 76 which may be constructed and arranged to accommodate an extendable drain tube 78 and/or a plug (not illustrated). The extendable drain tube 78 may be extended so that it may reach outside of the vehicle door so that the operator may empty water or other liquids out of the integrated storage unit seat bottom 24. The base 52 may comprise any number of materials including, but not limited to, a polymer such as polypropylene.

Figure 6:
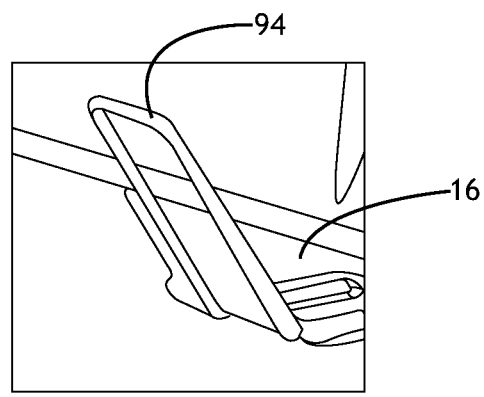
FIG. 6 illustrates a seat bottom attachment point according to a number of variations.

In a number of variations, the lid 30 may be attached to the base 52 via one or more retaining clip brackets 80, a variation of which is illustrated in FIG. 4. In a number of variations, a retaining clip bracket 80 may include a first leg 82, a second leg 86, and a third leg 90. The first leg 82 may be constructed and arranged to extend into the base 52. In one variation, the first leg 82 may include a bend 84 which may assist in securing the retaining clip bracket 80 to the base 52. The second leg 86 may include a curved end 88 so that it may accommodate a shaft 50 which may extend along at least a portion of the lid 30. The shaft 50 and second leg 86 may be constructed and arranged to act as a hinge point for the lid 30 so that the lid 30 may be opened so that the top face 32 may engage the seat back 22, a variation of which is illustrated in FIG. 5 or closed, a variation of which is illustrated in FIG. 4. The third leg 90 may include a curved end 92 and may be constructed and arranged to attach to a vehicle attachment 94 including, but not limited to, an ISOfix wire extending from the vehicle 16, variations of which are illustrated in FIGS. 4 and 6, so that when the integrated storage unit seat bottom 24 is locked to the vehicle 16, it may secure the integrated storage unit seat bottom 24 to the vehicle 16 during an impact event. The third leg 90 may also be constructed and arranged so that it may allow the integrated storage unit seat bottom 24 to be pivoted upward and removed from the vehicle 16.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a removable seat bottom for a vehicle comprising a seat cushion and a storage unit, wherein the seat cushion is pivotally attached to the storage unit.

Variation 2 may include a product as set forth in Variation 1 wherein the storage unit is insulated.

Variation 3 may include a product as set forth in any of Variations 1-2 wherein the storage unit includes a drain hole.

Variation 4 may include a product as set forth in any of Variations 1-3 further comprising at least one of an extendable drain hose or a plug which is attached to the drain hole.

Variation 5 may include a product as set forth in any of Variations 1-4 wherein the seat cushion comprises polypropylene with polyurethane foam and the storage unit comprises polypropylene.

Variation 6 may include a product as set forth in any of Variations 1-5 wherein the removable seat bottom includes at least one seating surface.

Variation 7 may include a product as set forth in any of Variations 1-6 wherein the removable seat bottom includes a first seating surface and a second seating surface.

Variation 8 may include a product as set forth in any of Variations 1-7 wherein the seat cushion includes at least one locking feature and the storage unit includes at least one locking feature which when engaged lock the seat bottom in a closed position.

Variation 9 may include a product as set forth in any of Variations 1-8 wherein the removable seat bottom is attached to a vehicle.

Variation 10 may include a product as set forth in Variation 9 wherein the removable seat bottom is attached to the vehicle via at least one retainer clip bracket.

Variation 11 may include a product as set forth in any of Variations 9-10 wherein the at least one retainer clip bracket is constructed and arranged to secure the removable seat bottom in the vehicle and to allow the removable seat bottom to be rotated upward and removed from the vehicle.

Variation 12 may include a product as set forth in any of Variations 9-11 wherein the storage unit includes a locking system to lock the seat bottom in a correct position in the vehicle.

Variation 13 may include a product comprising: an integrated storage unit seat bottom comprising: a seat cushion, wherein the seat cushion is constructed and arranged to support an occupant in a seated position; and a base, wherein the base is hollow and constructed and arranged to be a storage unit.

Variation 14 may include a product as set forth in Variation 13 wherein the seat cushion is pivotally attached to the base so that the storage unit can be opened and closed.

Variation 15 may include a product as set forth in any of Variations 13-14 wherein the seat cushion and the base each include at least one locking feature.

Variation 16 may include a product as set forth in any of Variations 13-15 further comprising a vehicle, wherein the integrated storage unit seat bottom is removeably attached to the vehicle.

Variation 17 may include a product as set forth in any of Variations 13-16 wherein the integrated storage unit seat bottom is removeably attached to the vehicle via at least one retainer clip bracket.

Variation 18 may include a product as set forth in any of Variations 13-17 wherein the integrated storage unit seat bottom is positioned and locked in the vehicle via at least one locking system on the base.

Variation 19 may include a product as set forth in any of Variations 13-18 wherein the base is insulated.

Variation 20 may include a product as set forth in any of Variations 13-19 wherein the base includes a drain tube and wherein the drain tube is constructed and arranged to extend out of the vehicle.

The above description of select variations within the scope of the invention is merely illustrative in nature and, thus, variations or variants thereof are not to be regarded as a departure from the spirit and scope of the invention.

What is claimed is:

1. A product comprising:
a removable vehicle seat bottom comprising a seat cushion, a storage unit, at least one retainer clip bracket, and a shaft which extends through the at least one retainer clip bracket to form a hinge between the seat cushion and the storage unit, and wherein the at least one retainer clip bracket is constructed and arranged to attach to a vehicle attachment; and
a vehicle, wherein the removable seat bottom is attached to the vehicle via the at least one retainer clip bracket.

2. The product of claim 1 wherein the storage unit is insulated.

3. The product of claim 2 wherein the storage unit includes a drain hole.

4. The product of claim 3 further comprising at least one of an extendable drain hose or a plug which is attached to the drain hole.

5. The product of claim 1 wherein the seat cushion comprises polypropylene with polyurethane foam and the storage unit comprises polypropylene.

6. The product of claim 1 wherein the removable seat bottom includes at least one seating surface.

7. The product of claim 1 wherein the removable seat bottom includes a first seating surface and a second seating surface.

8. The product of claim 1 wherein the seat cushion includes at least one locking feature and the storage unit includes at least one locking feature which when engaged lock the seat bottom in a closed position.

9. The product of claim 1 wherein the at least one retainer clip bracket is constructed and arranged to secure the removable seat bottom in the vehicle and to allow the removable seat bottom to be rotated upward and removed from the vehicle.

10. The product of claim 1 wherein the storage unit includes a locking system to lock the seat bottom in a correct position in the vehicle.

* * * * *